(12) United States Patent
Ladouceur et al.

(10) Patent No.: US 8,743,050 B2
(45) Date of Patent: Jun. 3, 2014

(54) HANDHELD DEVICE HAVING PIVOTALLY RETRACTABLE KEYPAD ASSEMBLY

(75) Inventors: Norman Miner Ladouceur, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 318 days.

(21) Appl. No.: 13/197,392

(22) Filed: Aug. 3, 2011

(65) Prior Publication Data

US 2013/0033431 A1  Feb. 7, 2013

(51) Int. Cl.
*G06F 3/02* (2006.01)

(52) U.S. Cl.
USPC ........... 345/156; 345/157; 345/158; 345/159; 345/160; 345/161; 345/162; 345/163; 345/164; 345/165; 345/166; 345/167; 345/168; 345/169; 345/170; 345/171; 345/172; 345/173; 345/174; 345/175; 345/176; 345/177; 345/178; 345/179; 345/180; 345/181; 345/182; 345/183; 345/184

(58) Field of Classification Search
USPC .................. 345/156–184; 341/20, 22–34
See application file for complete search history.

(56) References Cited

U.S. PATENT DOCUMENTS

| | | | |
|---|---|---|---|
| 5,044,798 A * | 9/1991 | Roylance et al. | 400/472 |
| 5,141,343 A | 8/1992 | Roylance et al. | |
| 6,139,207 A * | 10/2000 | Kawabe | 400/488 |
| 6,331,850 B1 * | 12/2001 | Olodort et al. | 345/168 |
| 7,283,852 B2 | 10/2007 | Fagerstrom et al. | |
| 7,372,959 B2 | 5/2008 | Ladouceur et al. | |
| 8,139,207 B2 * | 3/2012 | Braig et al. | 356/39 |
| 2009/0168317 A1 | 7/2009 | Wang et al. | |
| 2009/0180246 A1 | 7/2009 | Babella | |
| 2009/0251854 A1 | 10/2009 | Leung | |
| 2009/0279239 A1 | 11/2009 | Ha et al. | |
| 2010/0014236 A1 | 1/2010 | Zou et al. | |
| 2010/0142138 A1 | 6/2010 | Wang | |

FOREIGN PATENT DOCUMENTS

| | | |
|---|---|---|
| DE | 4337553 A1 | 5/1995 |
| WO | 2011001271 A1 | 1/2011 |

OTHER PUBLICATIONS

Communication: Extended European Search Report; Application No. 12156071.8-2224; Date Mailed: Apr. 27, 2012; pp. 1-4.
Extended European Search Report; Application No. 11176488.2-2224; Date Mailed: Oct. 7, 2011; pp. 1-4.

* cited by examiner

*Primary Examiner* — Alexander S Beck
*Assistant Examiner* — Jeffrey Steinberg
(74) *Attorney, Agent, or Firm* — Cantor Colburn LLP

(57) ABSTRACT

A handheld device includes a housing and a keypad assembly configured within the housing. The keypad assembly includes one or more groups of keys configured for movable positioning between a first orientation in which a top surface of an individual key is exposed to a user, and a second orientation in which the top surface of the key pivotally retracts into the housing so as to expose an edge surface of the key.

21 Claims, 8 Drawing Sheets

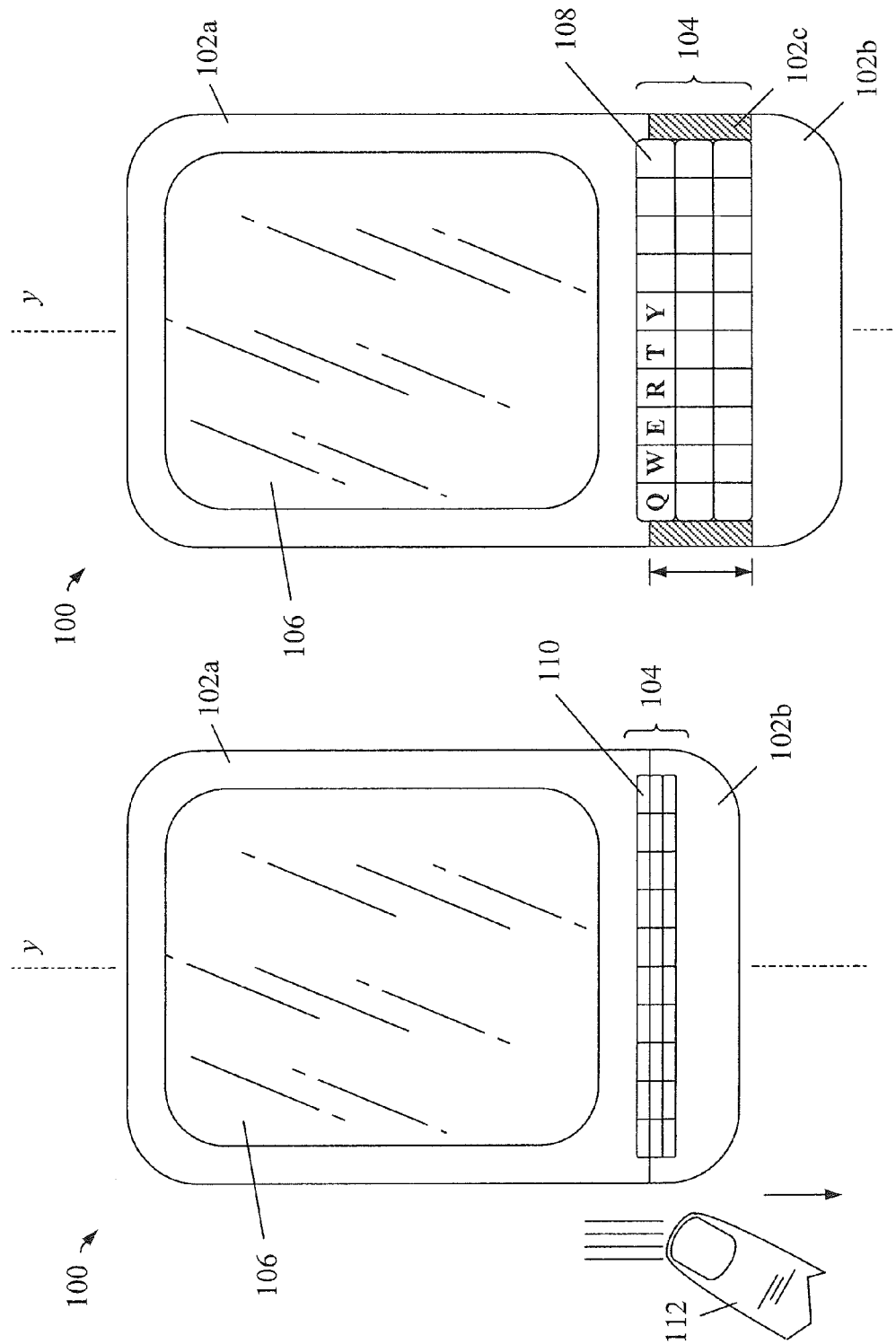

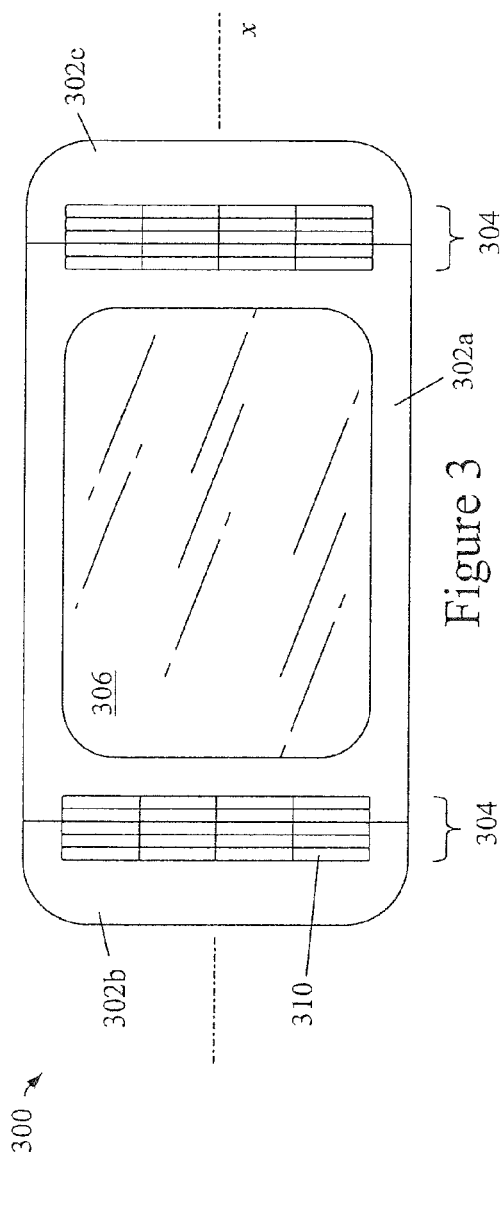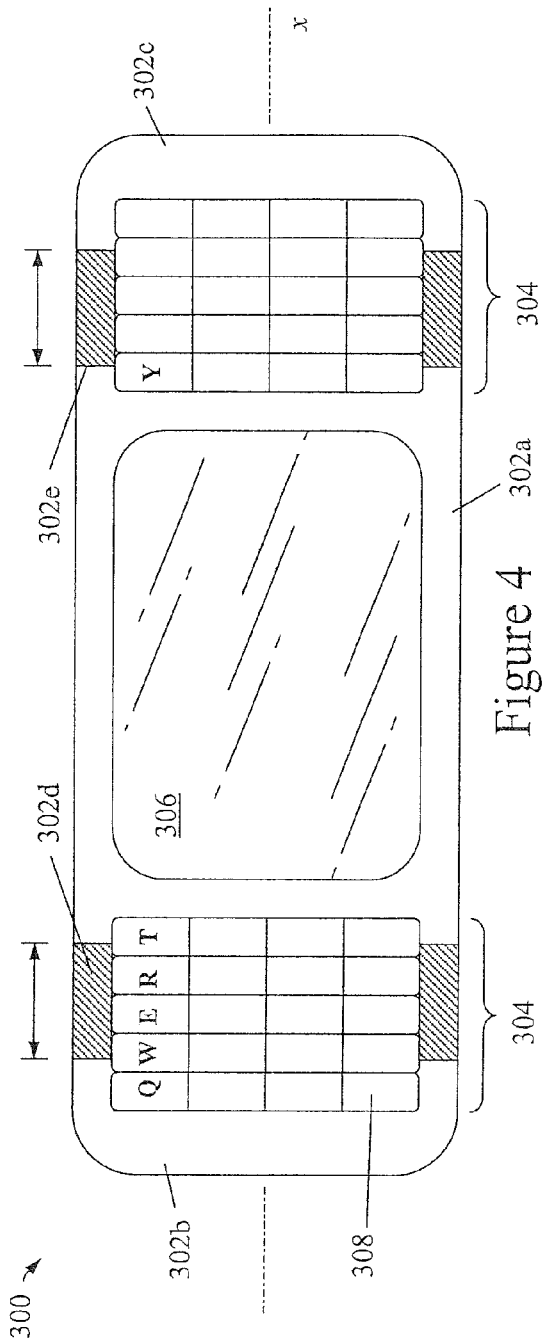

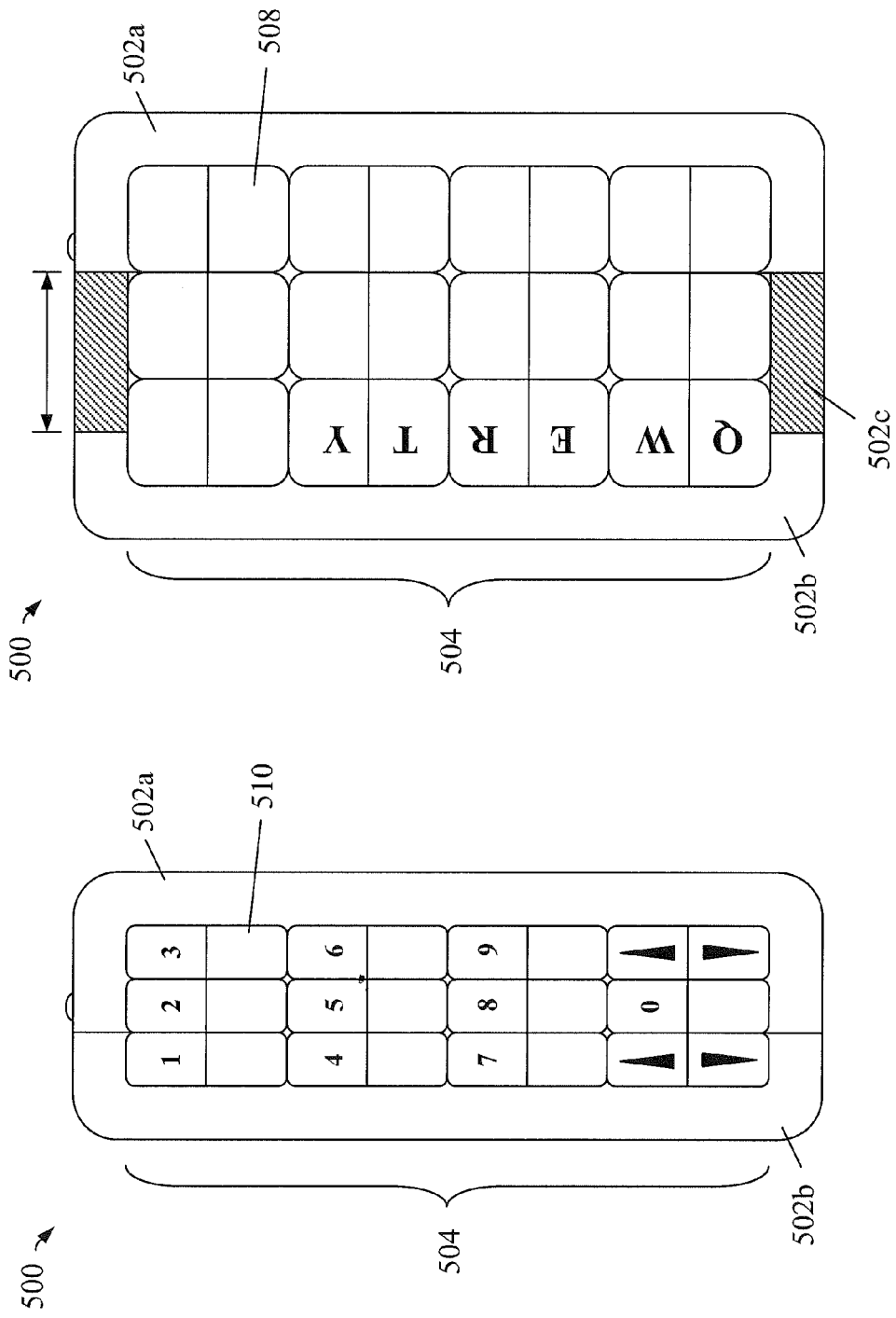

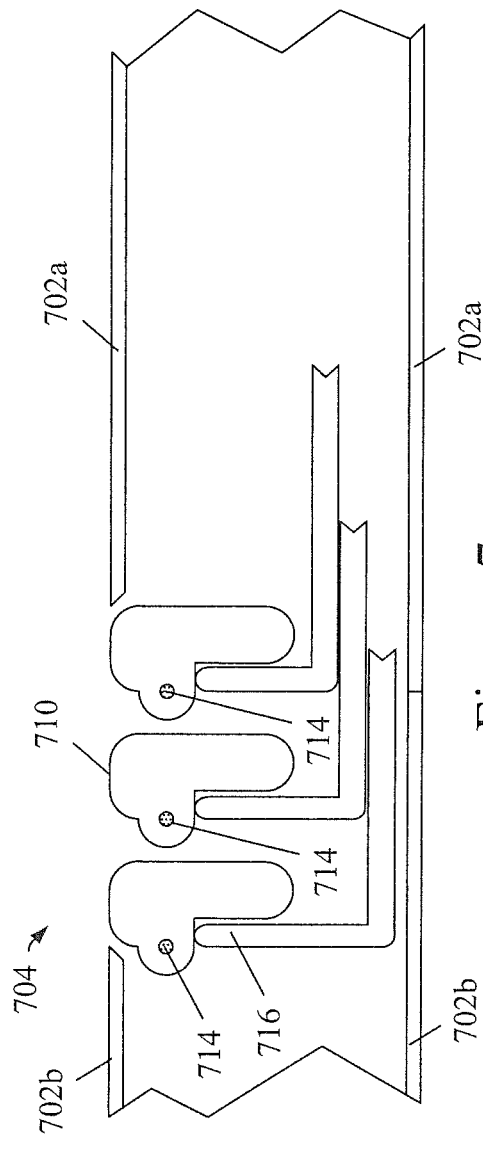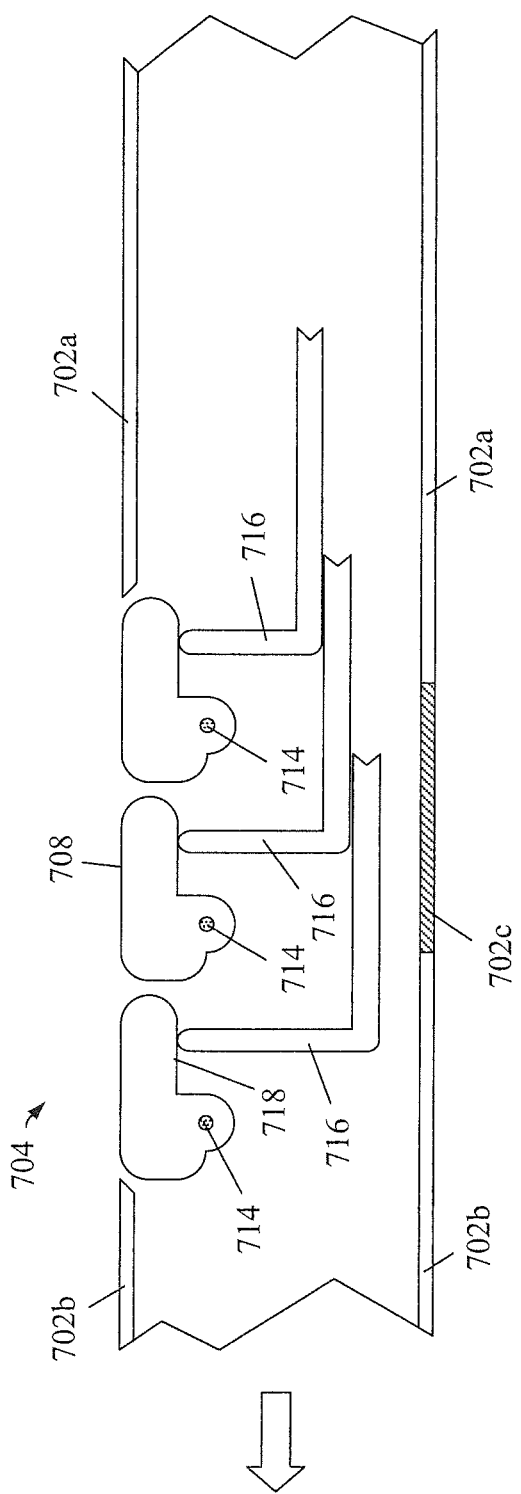

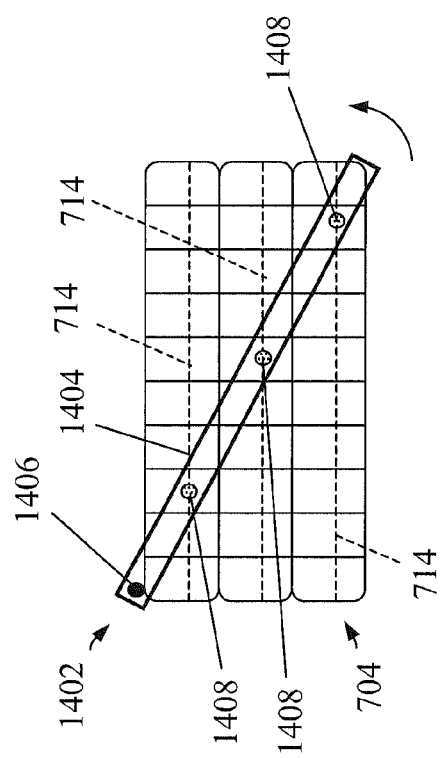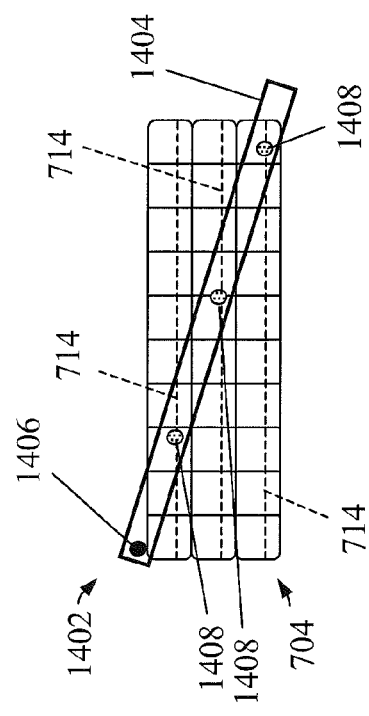

HANDHELD DEVICE HAVING PIVOTALLY RETRACTABLE KEYPAD ASSEMBLY

BACKGROUND

The present invention relates generally to handheld device technologies and, more particularly, to a handheld device having a pivotally retractable keypad assembly.

Keyboards and keypads are used on a wide variety of handheld devices such as, for example, telephones, mobile communication devices, remote control devices, and the like. The size of keyboards has continued to shrink over time as newer and smaller handheld devices become popular. As the size of such handheld devices has decreased, the more important it has become to utilize the entire keyboard surface as efficiently as possible.

In addition to traditional numerical keypads used for dialing a telephone number, next generation smart phones and mobile computing devices for example may also include additional interfaces such as touch screen or form factor QWERTY keypads to facilitate text messaging, e-mailing, web browsing and other functions. One such configuration may be the so-called slider phone that includes a sliding cover that may be opened to expose the additional keyboard for increased text input functionality. In devices like this (or with other folding or clamshell style devices), a significant amount of internal device real estate is reserved to accommodate the keypad and associated mechanism. This in turn results in a larger or thicker housing that is not as desirable as a thinner, albeit less functional, alternative.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1 is a top view of one exemplary embodiment of a handheld electronic device, configured in a retracted keypad orientation;

FIG. 2 is a top view of the handheld electronic device of FIG. 1, configured in an extended keypad orientation;

FIG. 3 is a top view of another exemplary embodiment of a handheld electronic device, configured in a retracted keypad orientation;

FIG. 4 is a top view of the handheld electronic device of FIG. 3, configured in an extended keypad orientation;

FIG. 5 is a top view of another exemplary embodiment of a handheld electronic device, configured in a retracted keypad orientation;

FIG. 6 is a top view of the handheld electronic device of FIG. 5, configured in an extended keypad orientation;

FIG. 7 is a cross sectional schematic view of a keypad assembly for a handheld device, depicted in a pivotally retracted position within an electronic device housing such that an edge surface of the keys are exposed;

FIG. 8 is a cross sectional schematic view of the keypad assembly of FIG. 7, depicted in an extended position such that a top surface of the keys are exposed;

FIG. 14 is a top view of a keypad assembly in the extended position and an associated bar linkage assembly;

FIG. 15 is a top view of the keypad assembly and the associated bar linkage assembly of FIG. 14 in the retracted position;

DETAILED DESCRIPTION

Figure 9:
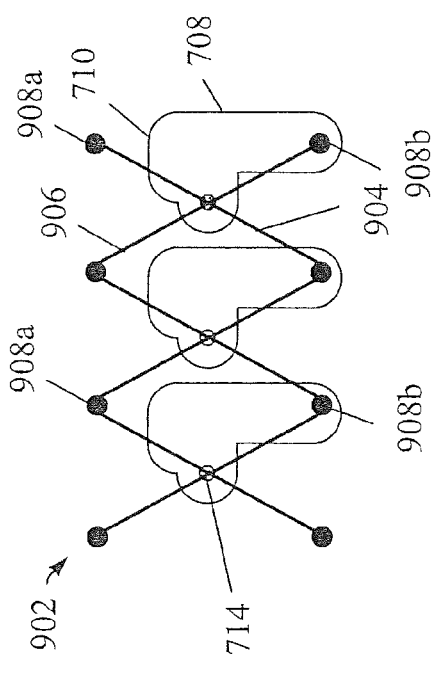
FIG. 9 is a schematic diagram of an exemplary scissor linkage assembly that may be used to facilitate movement of a keypad assembly from the retracted position to the extended position, with the individual rows of keys depicted in the retracted position.

Disclosed herein are various embodiments of a pivotally retractable keypad assembly for handheld devices such as telephones, mobile communication devices, remote control devices, and the like. Such embodiments allow for multiple rows (or columns) of keys to be movably positioned between a first orientation in which a top surface of an individual key is exposed to a user, and a second orientation in which the top surface of the key pivotally retracts into the housing so as to expose an edge surface of the key. When retracted, the keys may define a styling feature and/or a touch navigation feature. When in the opened position, the multiple rows of keys (e.g., 3, 4, 5 rows) may serve as a fully functional keyboard and can further include touch navigation functionality as well.

Referring initially to FIGS. 1 and 2, there is shown a handheld electronic device 100 in accordance with an exemplary embodiment. The device 100 includes a segmented housing including a first portion 102a and a second portion 102b, a keypad assembly 104 configured within the segmented housing, and a display screen 106 configured within the segmented housing. The keypad assembly 104 includes one or more groups of keys configured for movable positioning between a first or extended orientation (shown in FIG. 2) in which a top surface 108 of an individual key is exposed to a user, and a second or retracted orientation (shown in FIG. 1) in which the top surface 108 of the key pivotally retracts into the housing so as to expose an edge surface 110 of the key. Transitioning of the keypad assembly 104a from the retracted to the extended positions and vice versa may be achieved, for example, by sliding the first portion 102a of the housing away from the second portion 102b, and back toward one another.

It will be noted that the specific configuration of the keypad assembly 104 shown in FIGS. 1 and 2, with respect to features such as numbers of rows of keys, numbers of keys, letters and/or other linguistic elements depicted on the keys is exemplary only and thus should not be construed in any limiting sense. Rather, it is contemplated that other keypad configurations in accordance with the disclosed concepts may include different numbers of rows and columns of keys.

In the exemplary embodiments shown in FIGS. 1 and 2, the display screen 106 (or more generally an output apparatus) has a substantially planar surface and may include any structure suitable for providing a visual output to a user such as, for example, an LCD screen. In other embodiments as shown hereinafter, a handheld electronic device need not be provided with such a display screen.

With specific reference now to FIG. 2, in the first orientation of the keypad assembly 104 (as indicated above) the handheld device 100 is suited for a "full" input experience for the user, in that a fully functional keypad is exposed to facilitate, for example, full text input. Optionally, the first orientation shown in FIG. 2 may also be configured for so-called "touch navigation" that provides additional functionality beyond traditional touch-typing of the individual keys. For example, the keypad assembly 104 in the first orientation may be configured with capacitive touch sensor technology that allows for (for example) navigation between features depicted on the display screen 106. As also depicted in FIG. 2, the segmented housing is fully extended so as to reveal a retractable third portion 102c.

In contrast, as depicted in FIG. 1, in the second orientation of the keypad assembly 104, the rows of keys have been pivotally retracted within the interior of the housing 102 such that the top surface 108 of the keys is no longer exposed, and instead an edge surface 110 of the keys is now exposed to the user. Notably, movement of the handheld device 100 from the first orientation in FIG. 2 to the second orientation of FIG. 1 involves reducing the overall length of the segmented housing along a longitudinal axis, y, thereof such that the retractable third portion 102c disappears and the first and second portions 102a, 102b, abut one another. Conversely, movement of the handheld device 100 from the second orientation in FIG. 1 to the first orientation in FIG. 2 involves expanding the length of the segmented housing along the longitudinal axis, y, thereby revealing the third portion 102c.

With specific reference to FIG. 1, the retracted keypad assembly 104 may be configured as a "styling" feature per se, in that touching or depression of the edge surface 110 of the keys serves no function in particular. Alternatively, the retracted keypad assembly 104 may be configured for touch navigation functions, such as by swiping of a user's finger 112 across one or more of the keys in a given direction. Here, the edge surface 110 of the keys may also be provided with capacitive touch sensor capability.

In the exemplary embodiment of the handheld device 100 depicted in FIGS. 1 and 2, the handheld device 100 is configured in a portrait orientation, in that the long axis of the device is in the y-axis direction with the keypad assembly 104 located below the display screen 106. Other orientations, however, are also contemplated. For example, FIGS. 3 and 4 illustrate a handheld electronic device 300 in accordance with another exemplary embodiment. For ease of description, similar features are designated by like reference numerals in the drawings.

Similar to the embodiment of FIGS. 1 and 2, the embodiment of the handheld device 300 in FIGS. 3 and 4 includes a segmented housing. Here, the segmented housing includes a first portion 302a, a second portion 302b, a third portion 302c, a retractable fourth portion 302d, and a retractable fifth portion 302e (as shown in FIG. 4). The device 300 further includes a keypad assembly 304 configured within the segmented housing, and a display screen 306 configured within the first portion 302a of the segmented housing. The keypad assembly 304 includes one or more groups of keys configured for movable positioning between a first or extended orientation (shown in FIG. 4) in which a top surface 308 of an individual key is exposed to a user, and a second or retracted orientation (shown in FIG. 3) in which the top surface 308 of the key pivotally retracts into the housing so as to expose an edge surface 310 of the key. Here, however, the individual rows of keys of the keypad assembly are distributed or split so as to be disposed on opposite sides of the display screen 306.

With specific reference now to FIG. 4, in the first orientation of the keypad assembly 304 (as indicated above) the handheld device 300 is suited for a "full" input experience for the user, in that a fully functional keypad is exposed to facilitate, for example, full text input. Optionally, the first orientation shown in FIG. 4 may also be configured for so-called "touch navigation" that provides additional functionality beyond traditional touch-typing of the individual keys. For example, the keypad assembly 304 in the first orientation may be configured with capacitive touch sensor technology that allows for (for example) navigation between features depicted on the display screen 306.

In contrast, as depicted in FIG. 3, in the second orientation of the keypad assembly 304, the split rows of keys have been pivotally retracted within the interior of the segmented housing such that the top surface 308 of the keys is no longer exposed, and instead the edge surface 310 of the keys is now exposed to the user. Notably, movement of the handheld device 300 from the first orientation in FIG. 4 to the second orientation of FIG. 3 involves reducing the length of the segmented housing along a longitudinal axis, x, thereof such that the retractable fourth and fifth portions 302d, 302e, disappear, leaving the second and third portions 302b, 302c, abutting the first portion 302a. Conversely, movement of the handheld device 300 from the first orientation in FIG. 4 to the second orientation in FIG. 3 involves expanding the length of the segmented housing along the longitudinal axis, x, at two locations thereof, so as to reveal the fourth and fifth portions 302d, 302e.

Again, with specific reference to FIG. 3, the retracted keypad assembly 304 may be configured as a "styling" feature per se, in that touching or depression of the edge surface 310 of the keys serves no function in particular. Alternatively, the retracted keypad assembly 304 may be configured for touch navigation functions. Further, in the exemplary embodiment of the handheld device 300 depicted in FIGS. 3 and 4, the handheld device 300 is configured in a portrait orientation, in that the long axis of the device is in the x-axis direction.

While the exemplary embodiments of a handheld electronic device described to this point include an output or display screen (e.g., such as in a mobile communication device), still other handheld devices are also contemplated. Referring now to FIGS. 5 and 6, there is shown a handheld electronic device 500 in accordance with still another exemplary embodiment. The device 500 includes a segmented housing including a first portion 502a and a second portion 502b, and a keypad assembly 504 configured within the segmented housing. The keypad assembly 504 includes one or more groups of keys configured for movable positioning between a first or extended orientation (shown in FIG. 6) in which a top surface 508 of an individual key is exposed to a user, and a second or retracted orientation (shown in FIG. 5) in which the top surface 508 of the key pivotally retracts into the housing so as to expose an edge surface 510 of the key. As also depicted in FIG. 6, the segmented housing is fully extended so as to reveal a retractable third portion 502c.

The specific configuration of the keypad assembly 504 shown in FIGS. 5 and 6, with respect to features such as numbers of rows of keys, numbers of keys, letters and/or other linguistic elements depicted on the keys is exemplary only and thus should not be construed in any limiting sense. Rather, it is contemplated that other keypad configurations in accordance with the disclosed concepts may include different numbers of rows and columns of keys. In the embodiment depicted, the handheld device 500 may comprise a remote control device, such as those used for television viewing, for example. With such a device, the second orientation of the keypad assembly 504 shown in FIG. 5 may represent standard remote control features through activation of the edge surface 510 of the keys. In this regard, such features may include for example, numerical channel input, up/down channel control, up/down volume control, and the like. In addition, for the first orientation of the keypad assembly 506 shown in FIG. 6, an expanded keypad (e.g., QWERTY) may be used by activation of the top surfaces 508 of the keys for full text input.

Regardless of the specific type of electronic handheld device or the specific features enabled by actuation of the individual keys of the keypad assembly in either the first or second orientations, an internal mechanism facilitates movement of the keypad assembly from the first orientation to the second, retracted orientation. Referring now to FIGS. 7 and 8, there is shown a cross sectional schematic view of a keypad assembly 704 for a handheld device, in accordance with an exemplary embodiment. In FIG. 7, the keys are depicted in the second or pivotally retracted position within the electronic device segmented housing 702 such that the edge surfaces 710 of the keys are exposed. Here, the first portion 702*a* of the segmented housing abuts the second portion 702*b*. In FIG. 8, the keys are depicted in the first or pivotally extended position within the electronic device segmented housing such that the top surfaces 708 of the keys are exposed and the retractable third portion 702*c* of the housing is revealed. As further illustrated in FIGS. 7 and 8, the keys of the keypad assembly 704 have a cross-sectional shape (e.g., generally L-shaped) that is suitable for facilitating a pivoting motion of the individual rows of keys between the first and second orientations. In the exemplary embodiment depicted, each row of keys is coupled to a common pivot axis 714, about which the keys pivot, as assisted by a cam device 716.

In addition to providing a pivot point about which a row of keys pivots, one or more of the pivot axes 714 is configured for lateral displacement within the interior of the housing, so that the key rows may be appropriately spaced apart, depending on whether the keypad assembly 704 is in the expanded or retracted configuration. As the keypad assembly 704 transitions from the retracted configuration of FIG. 7 to the expanded configuration of FIG. 8, the rows of keys (and thus the pivot axes 714) move a certain distance along the direction of the arrow in FIG. 8. More specifically, each pivot axis travels a different distance with respect to one another when moved between the first and second orientations. Simultaneously, the cam device 716 for each row contacts a bottom surface 718 of the keys to facilitate the pivoting motion to the extended position.

Figure 10:
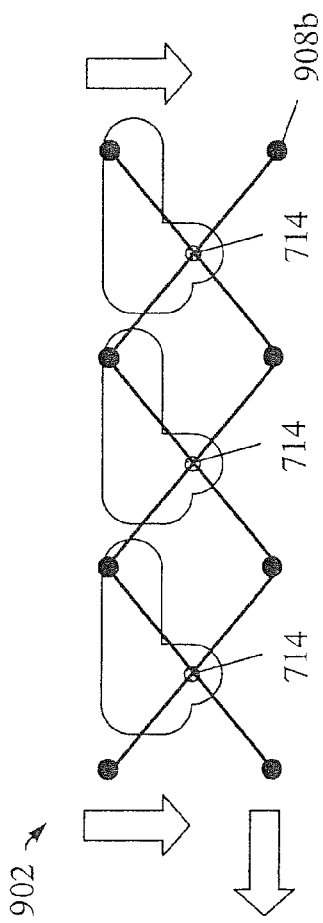
FIG. 10 is a schematic diagram of the scissor linkage assembly of FIG. 9, with the individual rows of keys depicted in the extended position.
Figure 11:
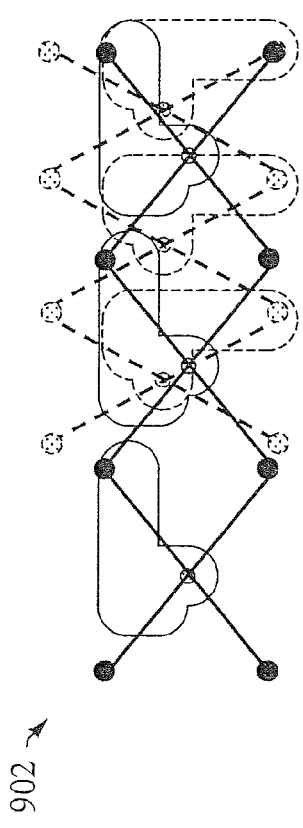
FIG. 11 is a schematic diagram of the scissor linkage assembly illustrating the position of FIG. 9 superimposed with the position of FIG. 10.

Each row of keys, including their common pivot axis 714, may be coupled to an appropriate mechanical linkage or pivoting mechanism that translates the axes 714 along a lateral direction as the handheld electronic device is moved between the first and second orientations. One such exemplary mechanical linkage is illustrated in FIGS. 9-11. As is shown, a scissor linkage assembly 902 includes a plurality of serially interconnected cross-shaped pairs of elongated lever arms 904, 906, with the two lever arms from each pair being pivotally interconnected at their intermediate length section by first pivot mounts which, in this embodiment, correspond to the common pivot axes 714. Outer ends of the elongated lever arms 904, 906, are connected to outer ends of an adjacent pair of elongated lever arms by second pivot mounts 908*a*, 908*b*. In the orientation depicted, the right most pair of second pivot mounts 908*a*, 908*b* remains fixed with respect to a horizontal direction, while the each of the bottom second pivot mounts 908*b* remains fixed with respect to a vertical direction. Thus, rightmost bottom second pivot mount 908*b* specifically shown in FIG. 10 remains fixed with respect to both horizontal and vertical directions, which in turn enables downward and leftward extension of the scissor linkage assembly 902 as shown in FIG. 10. Conversely, the upward and rightward retraction of the scissor linkage assembly 902 is shown in FIG. 9. For purposes of illustration, FIG. 11 depicts the scissor linkage assembly 902 wherein the position of FIG. 9 is superimposed with the position of FIG. 10.

Figure 12:
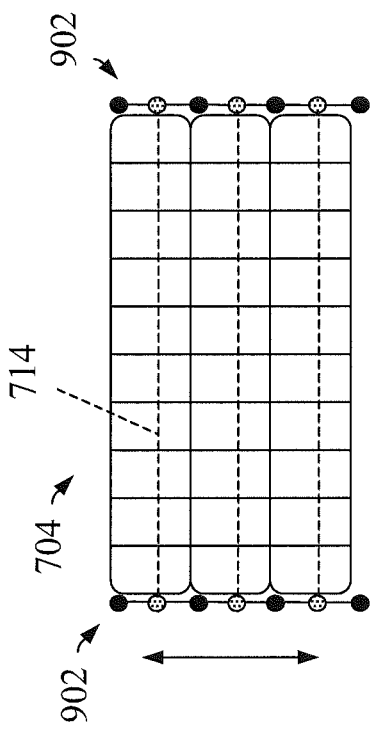
FIG. 12 is a top view of a keypad assembly and an associated scissor linkage assembly.
Figure 13:
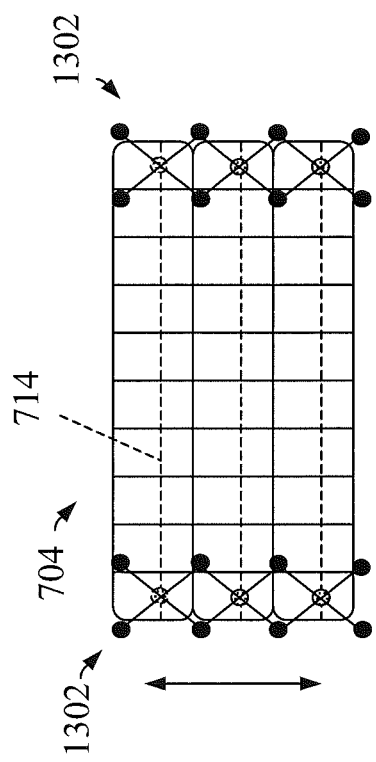
FIG. 13 is a top view of a keypad assembly and an associated scissor linkage assembly configured in a different planar orientation.

Referring next to FIG. 12, a top view of a keypad assembly 704 depicts a scissor linkage assembly 902 at opposing ends of the rows of keys, with each assembly 902 coupled to the pivot axis 714 of each row. In FIG. 13, an alternative embodiment of a scissor linkage assembly 1302 is depicted, in which the pivot points of the linkage assembly 1302 lie in a parallel plane with respect to the top surface of the keypad assembly 704.

Again, it should be appreciated that the above described scissor linkage assembly 902 (or 1302) is one contemplated mechanism for performing lateral translation of the individual groups of keys in the keypad assembly. Other linkages may also be used, including, but not limited to for example, a pivot arm assembly or some type of worm drive assembly. For example, FIG. 14 is a top view of the keypad assembly 704 arranged in the extended position through the use of an associated bar linkage assembly 1402. The bar linkage assembly 1402 includes a bar 1404 that rotates about a fixed pivot point 1406. Additional points 1408 along the bar 1406 are attached to respective pivot axes 714 of the keypad assembly 704. For example, as the bar 1406 rotates in a counterclockwise direction in FIG. 14, the keypad assembly 704 is caused to move to the retracted position, as shown in FIG. 15.

The primary, hand-activated open/closed travel of the above described keypad assembly embodiments may also be automated with various configurations of micromotors, gears, linkages, etc. That is, in addition to the above described mechanisms, other mechanisms are also contemplated for performing the travel movement from one keypad orientation to the other.

Figure 18:
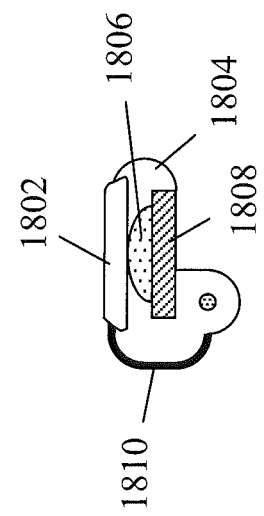
FIG. 18 is a side cross sectional view of yet another embodiment of a key structure.
Figure 17:
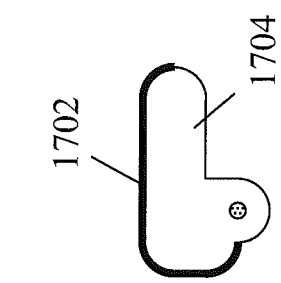
FIG. 17 is a side cross sectional view of another embodiment of a key structure.
Figure 16:
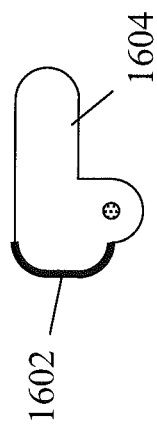
FIG. 16 is a side cross sectional view of one embodiment of a key structure.

As discussed previously, depending upon the orientation, individual keys of the keypad assembly may be configured for touch navigation functions, as well as standard keypad functions. In this regard, FIGS. 16 through 18 are side cross sectional views of various embodiments of a key structure. In FIG. 16, a capacitive sensor device 1602 is configured on the edge surface of a key 1604. This configuration may support, for example, touch navigation capability while the keypad assembly is in a retracted position. In FIG. 17, a capacitive sensor device 1702 is configured on both the edge and top surfaces of the key 1704. This configuration may support, for example, touch navigation capability while the keypad assembly is in either a retracted position or an extended position.

Finally, as illustrated in FIG. 18, still another key embodiment incorporates a mechanical type key structure in which a top surface 1802 of the key 1804 may include a hard or soft touch activation surface, and a dome shaped switch 1806 beneath the top surface 1802, with the dome shaped switch in communication with a printed circuit board 1808. The key 1804 may also include a capacitive sensor device 1810 configured on the edge surface of the key 1804.

As will thus be appreciated, an exemplary handheld device includes a housing and a keypad assembly configured within the housing. The keypad assembly includes one or more groups of keys and is configured for movable positioning between a first orientation in which a top surface of an individual key is exposed to a user, and a second orientation in which the top surface of the key pivotally retracts into the housing so as to expose an edge surface of the key.

As will be further appreciated, another exemplary handheld electronic device includes a housing, a keypad assembly configured within the housing, and a display screen configured within the housing. The keypad assembly includes one or more groups of keys configured for movable positioning between a first orientation in which a top surface of an individual key is exposed to a user, and a second orientation in which the top surface of the key pivotally retracts into the housing so as to expose an edge surface of the key.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A handheld device, comprising:
a housing; and
a keypad assembly configured within the housing;
the keypad assembly including one or more groups of keys configured for movable positioning between a first orientation in which a top surface of an individual key is exposed to a user, and a second orientation in which the top surface of the key pivotally retracts into the housing so as to expose an edge surface of the key; and
a pivoting mechanism configured to movably position the one or more groups of keys between the first orientation and the second orientation, the pivoting mechanism comprising a separate pivot axis for each group of keys such that each individual key within a given group of keys pivots about the same pivot axis, wherein the pivoting mechanism comprises a cam device associated with each pivot axis, the cam device engaged with a bottom surface of one or more of the individual keys such that the cam device lifts an associated group of keys to the second orientation.

2. The device of claim 1, wherein the housing further comprises a segmented housing having at least a first portion and a second portion that abut one another in the second orientation, with the first and second portions configured to expand apart from one another along a first axis thereof to transition from the second orientation to the first orientation, thereby revealing a third portion of the segmented housing, and the first and second portions further configured to retract back along the first axis to transition from the first orientation to the second orientation, thereby hiding the third portion of the segmented housing.

3. The device of claim 1, wherein each pivot axis travels a different distance with respect to one another when moved between the first and second orientations.

4. The device of claim 1, wherein the pivoting mechanism comprises one or more scissor linkage assemblies.

5. The device of claim 1, wherein the pivoting mechanism comprises a scissor linkage assembly coupled at opposing ends of each pivot axis.

6. The device of claim 1, wherein the pivoting mechanism comprises a bar linkage assembly that rotates about a fixed pivot point and has additional pivot points coupled to each pivot axis.

7. A handheld device, comprising:
a housing; and
a keypad assembly configured within the housing;
the keypad assembly including one or more groups of keys configured for movable positioning between a first orientation in which a top surface of an individual key is exposed to a user, and a second orientation in which the top surface of the key pivotally retracts into the housing so as to expose an edge surface of the key, wherein each key has a substantially L-shaped cross section.

8. The device of claim 1, wherein each key comprises one or more of: a hard touch key, a soft touch key, a capacitive touch sensor, and combinations thereof.

9. The device of claim 1, wherein the first axis comprises a longitudinal axis of the housing.

10. The device of claim 1, wherein the first axis comprises a lateral axis of the housing.

11. The device of claim 1, wherein activation of the one or more groups of keys in the first orientation performs a first function, and activation of the one or more groups of keys in the second orientation performs a second function.

12. The device of claim 11, wherein the first function comprises individual character key input, and the second function comprises touch navigation.

13. The device of claim 11, wherein the first function additionally comprises touch navigation.

14. A handheld electronic device, comprising:
a housing;
a keypad assembly configured within the housing; and
a display screen configured within the housing;
the keypad assembly including one or more groups of keys configured for movable positioning between a first orientation in which a top surface of an individual key is exposed to a user, and a second orientation in which the top surface of the key pivotally retracts into the housing so as to expose an edge surface of the key; and
wherein the housing further comprises a segmented housing having at least a first portion and a second portion that abut one another in the second orientation, with the first and second portions configured to expand apart from one another along a first axis thereof to transition from the second orientation to the first orientation, thereby revealing a third portion of the segmented housing, and the first and second portions further configured to retract back along the first axis to transition from the first orientation to the second orientation, thereby hiding the third portion of the segmented housing.

15. A handheld electronic device, comprising:
a housing;
a keypad assembly configured within the housing; and
a display screen configured within the housing;
the keypad assembly including one or more groups of keys configured for movable positioning between a first orientation in which a top surface of an individual key is exposed to a user, and a second orientation in which the top surface of the key pivotally retracts into the housing so as to expose an edge surface of the key; and
a pivoting mechanism configured to movably position the one or more groups of keys between the first orientation and the second orientation, the pivoting mechanism having a separate pivot axis for each group of keys such that each individual key within a given group of keys pivots about the same pivot axis, and wherein each pivot axis travels a different distance with respect to one another when moved between the first and second orientations.

16. The device of claim 15, wherein the pivoting mechanism father comprises:
   a scissor linkage assembly coupled at opposing ends of each pivot axis; and
   a cam device associated with each pivot axis, the cam device engaged with a bottom surface of one or more of the individual keys such that the cam device lifts an associated group of keys to the second orientation.

17. The device of claim 15, wherein the pivoting mechanism further comprises:
   a bar linkage assembly that rotates about a fixed pivot point and has additional pivot points coupled to each pivot axis; and
   a cam device associated with each pivot axis, the cam device engaged with a bottom surface of one or more of the individual keys such that the cam device lifts an associated group of keys to the second orientation.

18. The device of claim 14, wherein each key has a substantially L-shaped cross section.

19. The device of claim 14, wherein each key comprises one or more of: a hard touch key, a soft touch key, a capacitive touch sensor, and combinations thereof.

20. The device of claim 14, wherein activation of the one or more groups of keys in the first orientation performs a first function, and activation of the one or more groups of keys in the second orientation performs a second function.

21. The device of claim 14, wherein the keypad assembly is split so as to be disposed on opposite sides of the display screen.

* * * * *